United States Patent
O'Neil et al.

(10) Patent No.: US 10,299,354 B2
(45) Date of Patent: May 21, 2019

(54) ZIGBEE OPERATED PHASE CONTROL LIGHTING CONTROLLER WITH SENSORS

(71) Applicant: EPtronics, Inc., Gardena, CA (US)

(72) Inventors: Tom O'Neil, Torrance, CA (US); Lee Chiang, Sylmar, CA (US)

(73) Assignee: EuControls, Corp, Gardena, CA (US)

( * ) Notice: Subject to any disclaimer, the term of this patent is extended or adjusted under 35 U.S.C. 154(b) by 52 days.

(21) Appl. No.: 15/356,447

(22) Filed: Nov. 18, 2016

(65) Prior Publication Data
US 2018/0063929 A1   Mar. 1, 2018

Related U.S. Application Data

(63) Continuation-in-part of application No. 15/254,492, filed on Sep. 1, 2016, now Pat. No. 9,730,301.

(51) Int. Cl.

| | |
|---|---|
| H05B 37/02 | (2006.01) |
| H05B 33/08 | (2006.01) |
| H04W 4/80 | (2018.01) |
| H04W 4/70 | (2018.01) |

(52) U.S. Cl.
CPC .......... *H05B 37/0272* (2013.01); *H04W 4/80* (2018.02); *H05B 33/0815* (2013.01); *H05B 33/0845* (2013.01); *H05B 33/0854* (2013.01); *H04W 4/70* (2018.02)

(58) Field of Classification Search
CPC ................. H05B 37/0272; H05B 33/0854
USPC ................... 315/149, 291, 308, 309
See application file for complete search history.

(56) References Cited

U.S. PATENT DOCUMENTS

| | | | |
|---|---|---|---|
| 8,644,166 B2 | 2/2014 | Xia et al. | |
| 8,874,734 B1 | 10/2014 | Straz | |
| 9,107,248 B2 | 8/2015 | Chen | |
| 9,401,588 B2 | 7/2016 | Zulim et al. | |
| 9,544,965 B1* | 1/2017 | O'Neil | H05B 33/0845 |
| 2006/0044152 A1 | 3/2006 | Wang | |
| 2011/0054700 A1 | 3/2011 | Chan et al. | |
| 2012/0013434 A1 | 1/2012 | Park et al. | |
| 2012/0139426 A1* | 6/2012 | Ilyes | F21V 23/02 315/152 |
| 2012/0310800 A1 | 12/2012 | Xia | |
| 2013/0175931 A1* | 7/2013 | Sadwick | H05B 37/0245 315/158 |
| 2014/0046462 A1 | 2/2014 | Mets | |
| 2015/0115807 A1 | 4/2015 | Schreder | |
| 2016/0330808 A1* | 11/2016 | Brandt | H05B 33/0845 |

\* cited by examiner

*Primary Examiner* — Thuy Vinh Tran
(74) *Attorney, Agent, or Firm* — Clement Cheng

(57) ABSTRACT

A wireless operated LED lighting controller has both analog and phase control outputs which operate a dimming luminaire, and sensors for lighting and motion which operate autonomously as needed. In addition it is locally operated by a handheld infra-red controller. At least one sensor can be chosen from the group of: a light detector, a motion detector, an acoustic detector, a temperature sensor, and a microwave detector. The sensor is electrically connected to the phase control output. A light output of the controller is affected by signals detected by the at least one sensor. The lighting controller has the phase control output enabled for either a leading edge dimming or a trailing edge dimming, and has a mode for completely turning off the dimming luminaire.

3 Claims, 4 Drawing Sheets

ZIGBEE OPERATED PHASE CONTROL LIGHTING CONTROLLER WITH SENSORS

The present invention claims priority from and is a continuation in part of parent application U.S. utility patent application Ser. No. 15/254,492 filed Sep. 1, 2016, by same first named inventor Tom O'Neil, entitled "Wireless Lighting Control Module For LED Drivers," the disclosure of which is incorporated herein by reference, being filed by EPtronics, Inc. assignee.

FIELD OF THE INVENTION

The field of this invention relates to wireless operated dimming controllers intended to be added on to existing dimmable LED luminaires that communicate with the luminaires by phase-cutting the luminaire input power, which have sensing capability allowing them a degree of autonomous operation.

DISCUSSION OF RELATED ART

It is well-known in the lighting industry to make a controller for AC power line dimmable luminaires, which are operated using the ZigBee wireless system. Such a product is described, for example, in U.S. Pat. No. 9,401,588, issued to inventor Zulim on Jul. 26, 2016. However, the Zulim device lacks any sensing capability such as the ability to respond differently depending on the ambient lighting conditions, or to sense sound or motion in the vicinity in order to trigger a light output. It also lacks the capability to drive luminaires requiring the commonplace 0-10V analog control protocol, or of being operated by a local infrared hand-held controller. US patent application 2015/0115807 by Schroder in April 2015 is interesting because it describes a ZigBee-operated luminaire controller which controls luminaires not by phase-cutting but instead using the 0-10V analog control format. It also incorporates light sensing and a motion detector, but lacks capability for local infrared control. US application 2014/0046462 by Dnepropetrovsk in August 2013 is relevant because it does have the capability for local infrared control. However, the product is not designed to add on to existing dimmable luminaires, and even though it does describe a motion detector and a light sensor, it has neither 0-10V analog dimming nor phase control dimming capability. It also lacks light sensing and lighting control in one unit, which would be a very useful combination to have.

Based on the aforementioned information, it is apparent that there is a need in the marketplace for a controller for existing dimmable LED luminaires that can receive instructions over a ZigBee wireless channel and control the luminaire either by forward/reverse phase control or 0-10V analog control. Such an ideal controller would incorporate both light sensing and light control in one unit and have the capability of responding to light variations and motions detected in the vicinity, while allowing an operator to activate the controller locally using an infrared controller. The present invention meets these unmet needs.

REFERENCES

U.S. Pat. No. 9,401,588. Inventors: Dalibor Zulim, Conyers, Ga. (US); Richard L. Westrick, Jr., Social Circle, Ga. (US); Leslie Mullins, Madison, Ga. (US); Audwin W. Cash, Lilburn, Ga. (US).

US patent application 2015/0115807. Inventors: Helmut Schroder, Wiesbaden (DE); Daniel Brand, Koln (DE).

US patent application 2014/0046462. Inventor: Maxym Mets, Dnepropetrovsk (UA).

US patent application 2006/0044152. Inventor: Ling Wang, Millwood, N.Y. (US).

SUMMARY OF THE INVENTION

A controller for operating a dimmable LED luminaire comprises a ZigBee transceiver which can communicate with a network of other similar controllers and a local area network (LAN) access point which is a gateway to the Internet. The controller also comprises two outputs for controlling luminaires—a phase cut output which can provide either leading edge or trailing edge dimming, and a 0-10V analog dimming output which can control suitable equipped luminaires. The controller has connection points for various sensors—for example light, acoustic noise, motion and microwaves. The controller uses the signals from these sensors to operate the luminaire in a responsive way—for example turning on the lights when motion is detected during hours of darkness, or modulating the light output so that a constant level of ambient light is detected. One of the sensors is for signals from an infra-red controller which can be used to manually override the wireless control signals for local manual operations, for example for testing purposes.

A first embodiment of the invention comprises a ZigBee-enabled LED lighting controller having a phase control output for controlling a dimming luminaire and further comprising sensors including at least one of a light detector, a motion detector, an acoustic detector, a temperature sensor and a microwave detector; characterized in that the light output of the controller may be affected by the signals detected by the sensors. A second embodiment of the invention is the same as the first embodiment but further characterized by having the phase control output enabled for either leading edge dimming or trailing edge dimming. A third embodiment of the invention is the same as the second embodiment but has an additional 0-10V output to effect analog control of a 0-10V dimming luminaire. A fourth embodiment of the invention is the same as the third embodiment but additionally has an infrared sensor to allow local operation of the controller by a hand held infra-red transmitter. A fifth embodiment of the invention is the same as the fourth embodiment but has the additional property that the signals from the sensors and detectors can be transmitted over the ZigBee network.

Additional features and advantages of the invention will be set forth in the description that follows, and in part will be apparent from the description, or may be learned by practice of the invention. The objectives and other advantages of the invention will be realized and attained by the structure pointed out in the written description and claims hereof, as well as the appended drawings.

Figure 1:
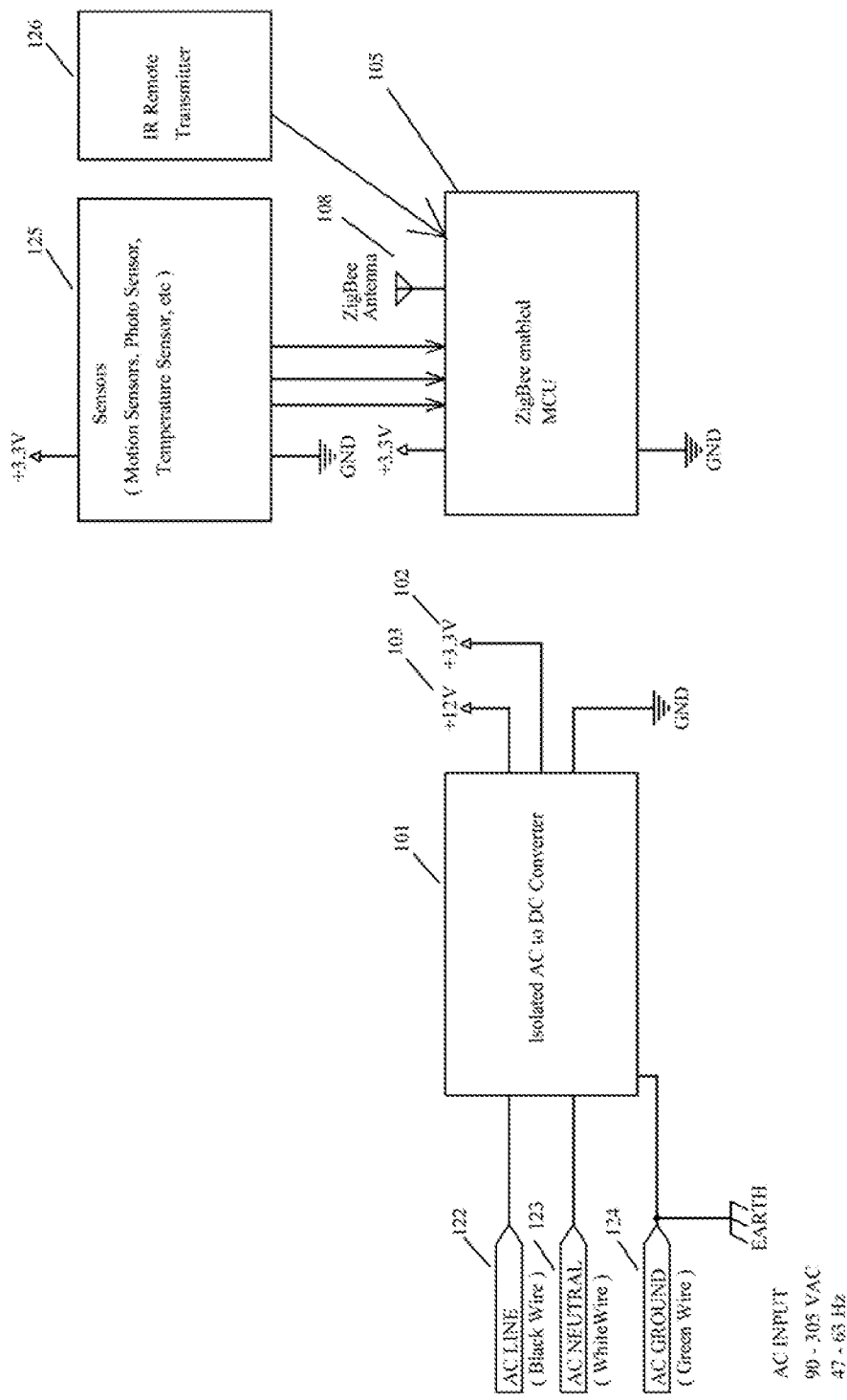
FIG. 1 shows prior art ZigBee sensor unit.

The following call out list of elements can be a useful guide in referencing the elements of the drawings.
101 AC/DC power converters
102 +3.3V
103 +12V
105 microcontroller
106 logic level
107 dimming command in PWM format
108 ZigBee Antenna
109 NPN Transistor
110 relay
111 power
112 R2
113 C1
114 Op Amp
115 dimming control input
116 –DIM
120 block
122 AC LINE
123 AC NEUTRAL
124 AC GROUND
125 sensors
126 IR Remote Transmitter
130 sensors
201 first local area network
202 second local area network
203 Ethernet Cable
204 Internet Access (WAN)
205 LED Driver (Constant Current Mode)
206 +LED
207 –LED
210 Antenna 2
601 T1
602 D4 IN4148
603 R61
604 C61 10 uF
605 Z2 12V Zener
606 12 VDC-ISO
607 U5
608 Q4 MOSFET-N
609 Q5 MOSFET-N
611 Lighting Device Circuit
612 GND-ISO
701 ACL-ON
702 +5 VDC
703 Bridge Rectifier
704 R64 470K
706 microcontroller

DETAILED DESCRIPTION OF THE INVENTION

Figure 2:
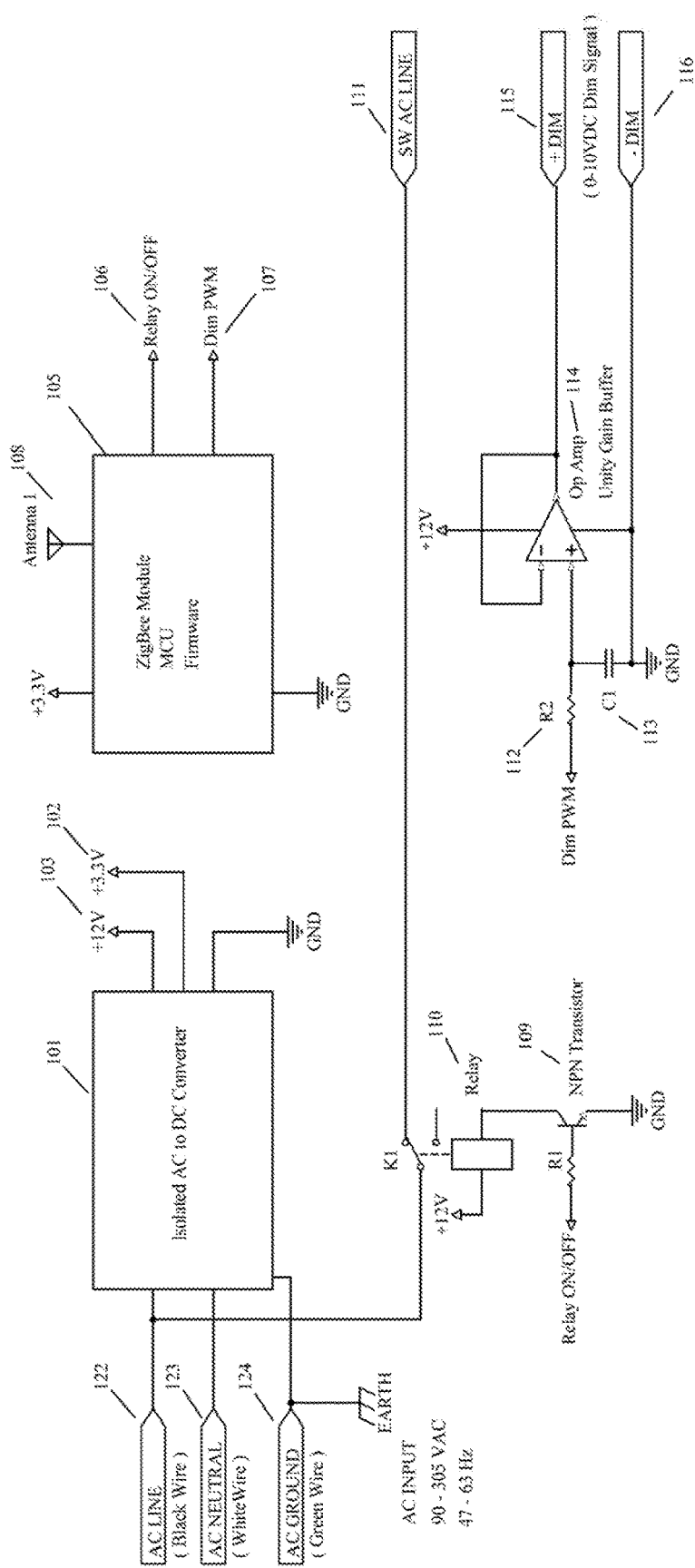
FIG. 2 shows prior art ZigBee lighting control module with AC relay and 0-10V dimming.

The following glossary can be a useful guide in interpreting the abbreviations of the disclosure of the present invention.
MCU is a microcontroller unit
LE is a leading edge
TE is a trailing edge
AC/DC refers to alternating current direct current
WAN wide area network
LED refers to a light emitting diode In prior art ZigBee controlled lighting systems, such as described by Wang in US patent application 2006/0044152, there is a central controller which communicates wirelessly with an array of ZigBee-enabled dimming lights and a corresponding array of light sensors, motion sensors etc. Each sensor is a node on the ZigBee network and each dimming light is a node on the ZigBee network. Depending on the signals received from the sensors, the central controller operates the ZigBee-enabled dimming lights to be off or on at a specific brightness level. FIG. 1 shows a block diagram of the kind of sensor control unit used. It embodies a microcontroller (MCU) 105, which receives signals from the sensors 125. After suitable processing, it sends them on to a ZigBee transceiver so that the central controller is aware of the light levels or the presence of motion and can command the controlled lights accordingly. FIG. 2 shows an example of one of the ZigBee operated lighting control modules as described in the parent application U.S. utility patent application Ser. No. 15/254,492, filed Sep. 1, 2016, by same first named inventor Tom O'Neil, entitled "Wireless Lighting Control Module For LED Drivers," the disclosure of which is incorporated herein by reference. Such a lighting control module would function as the control for one of the ZigBee operated lights in the Wang reference (US patent application 2006/0044152). The lighting control module incorporates a microcontroller unit 105 which has a ZigBee transceiver inside it. The lighting control module outputs signals representing a dimming command in PWM format 107 and a logic level 106 intended to turn on or off a relay 110, which provides power 111 to the dimmable luminaire being controlled. The dimming command 107 is converted into an analog 0-10V level by opamp 114 for operating a 0-10V dimming control input 115 on the luminaire.

It is apparent that there is a high degree of overlap between the functions of the sensing unit and the lighting control module. Both of them have AC/DC power converters 101 to run off the power line. Both of them have a microcontroller 105 incorporating a ZigBee wireless transceiver with antenna 108, which represent a considerable cost.

Figure 3:
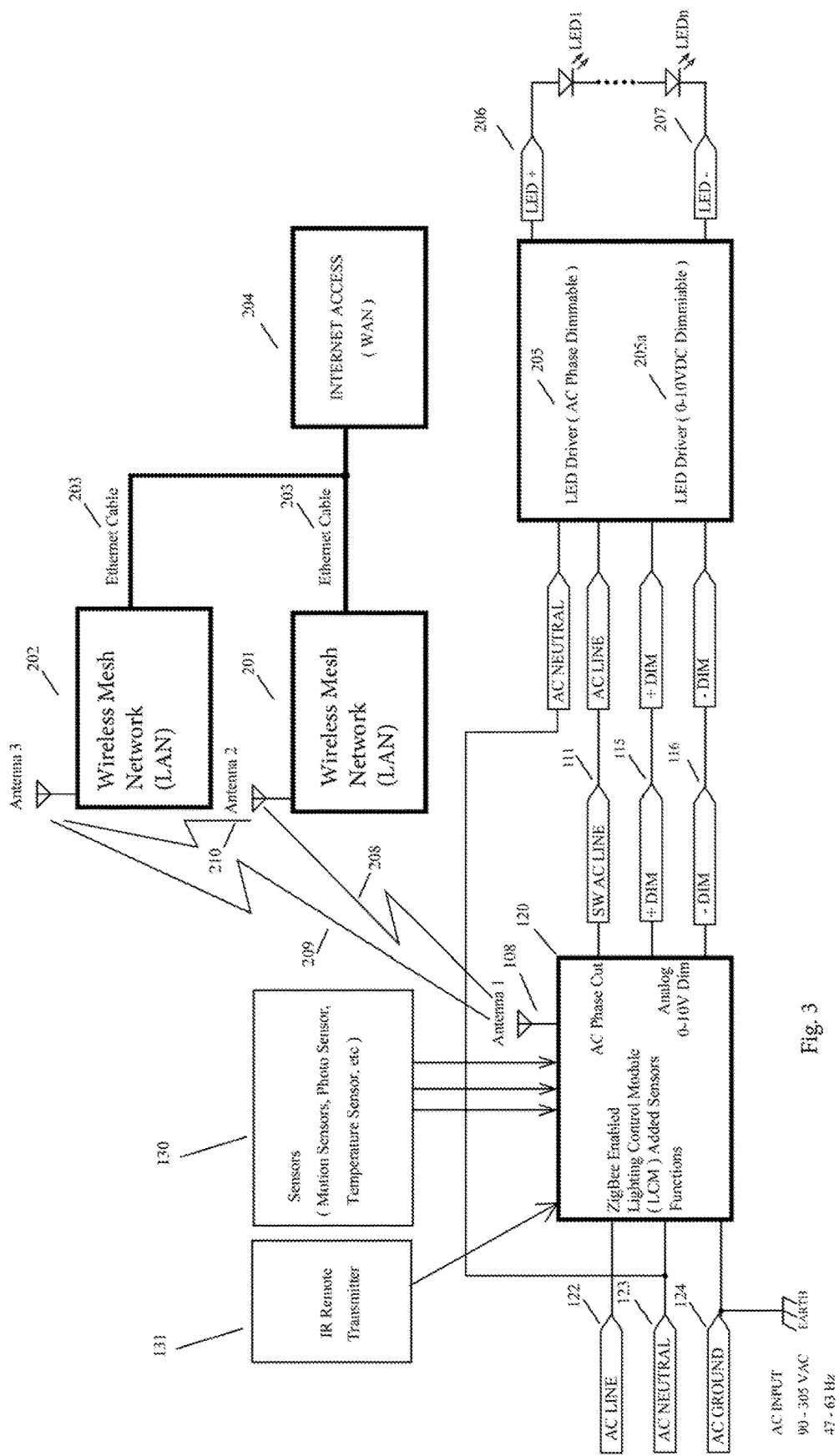
FIG. 3 shows ZigBee operated phase control lighting control module with sensors connected to a dimming luminaire.
Figure 4:
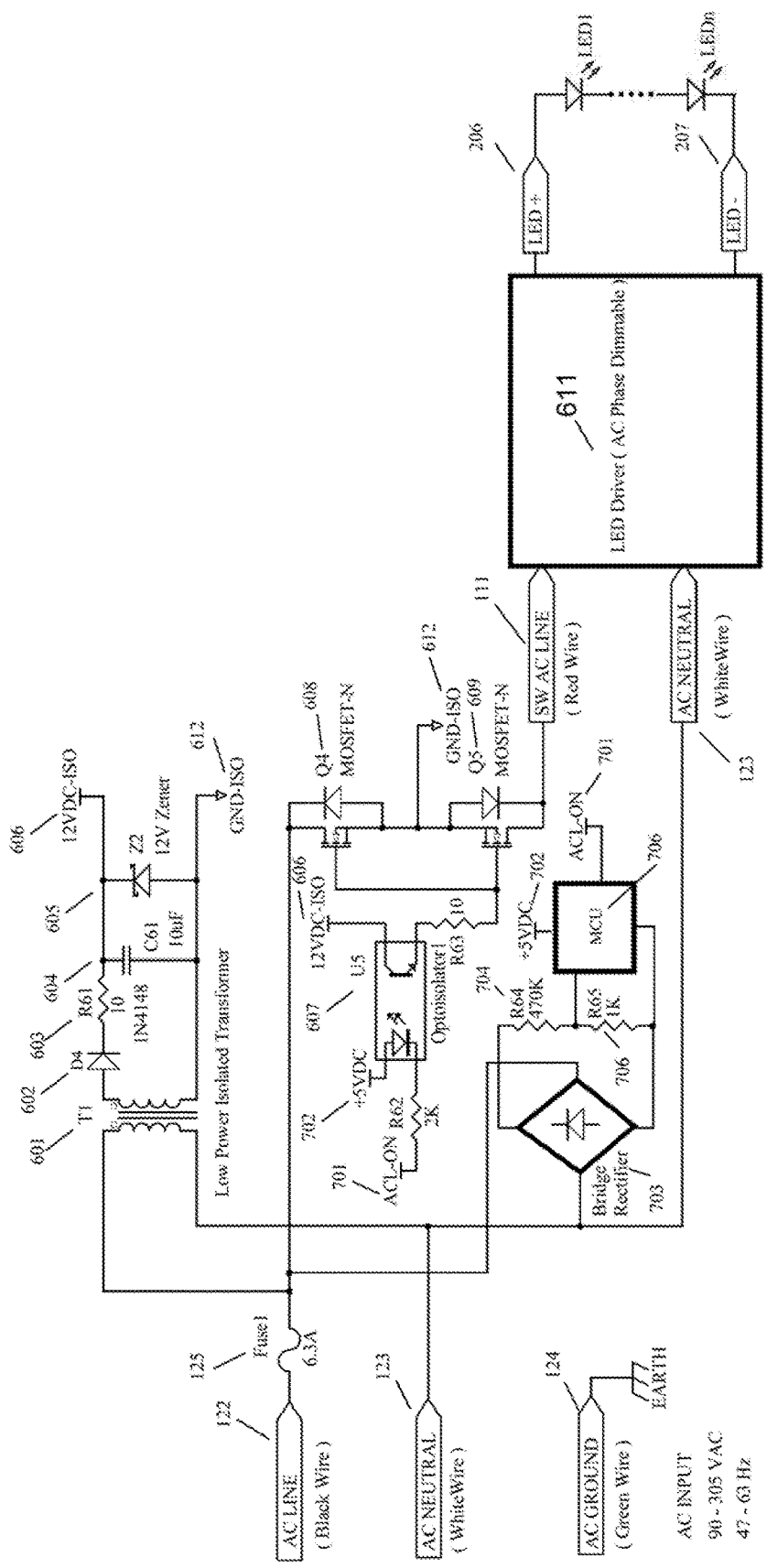
FIG. 4 shows circuit for AC phase cut dimming.

The present invention represents a savings over having separate ZigBee sensing units and ZigBee lighting control modules. A block diagram is shown in FIG. 3. Here a microcontroller 120 is now directly connected to sensors 130 such that it can be fed data representing the local light level, an output from a motion detector, an output from a temperature sensor, an output from an acoustic sound detector or the output from a microwave detector. It is capable of processing this data and modulating the light output accordingly. Inside the lighting control module is a circuit shown in FIG. 4. The microcontroller 706 in this diagram is part of and inside the block 120 in FIG. 3. An output from this microcontroller puts out a control signal for a pair of mosfets which can cause them to modulate the voltage from the AC power line using either leading edge (LE) dimming or trailing edge (TE) dimming. The present invention has additional non-obvious advantages compared to the simplistic combination of a ZigBee sensor and a ZigBee lighting control module. For example, it is now possible to inexpensively connect to the microcontroller 120 to an infrared (IR) remote transmitter 131 which allows it to detect IR pulse trains from a local hand held controller. This feature allows the ZigBee programming coming from over the network to be temporarily overridden by a local operator for the purpose of testing.

No process of identification and assignment of the instructions is required since the instructions are only applicable to the local lighting control module which receives the instructions. It also allows the local programming of the MCU in block 120, for example the threshold for a motion detector, to be reprogrammed at will. Prior art inventions only put out 0-10V analog signals, but the present invention puts out both an analog 0-10V signal for analog dimming, and also a phase cut signal (either LE or TE). These signals can be used not only for dimming a luminaire equipped to respond to such signals, but can also be programmed to completely cut off power to (turn off) a luminaire which only has say, 0-10V analog dimming capability. Thus the expensive relay 110 used by prior art lighting control modules is no longer needed. FIG. 3 shows how in the present invention the ZigBee interface connects to a first and second local area network 201, 202 which can contain a remote central control system. The remote central control system can override the local decision making of the lighting control module as needed, for example commanding to turn on every light in the system simultaneously. An advantage of the present invention is that the processing power required of the central controller is greatly reduced. In prior art systems, the central controller had to compare the light sensed by each light sensing node and compare that with what was intended. Then it had to compute the required light output from the nearby lighting units and send a corresponding light level command to each lighting unit. By contrast, in the present invention the central controller simply transmits the required light level, and the combined lighting control module measures the local light level and provides a light output which brings that light level up to the intended level. The overall control architecture is greatly simplified by the existence of these combined units with local feedback. An important feature of the present invention is that it can be added on as an assembly to existing luminaires, which have either phase control dimming or 0-10V dimming capability, thus making these luminaires become part of a ZigBee network.

For illustration purposes, ZigBee wireless control has been described throughout. However, any wireless control system could equally well-embody the invention. It will be apparent to those skilled in the art that various modifications and variations can be made in the present invention without departing from the spirit or scope of the invention. For example, a wide variety of different brands of microcontrollers can provide the same or a similar functionality. Different sensors to those mentioned can produce equally beneficial results. USA universal voltage AC inputs are mentioned, but lower voltage (e.g. European 230V) or higher voltage (e.g. Canadian 347V) supplies can equally be used. A local IR transmitter is mentioned, but the same benefits can be achieved with a simple short-range radio transmitter separate from the ZigBee transceiver.

The present invention includes a +3.3V 102 and a +12V 103 voltage electrically connected to an isolated AC/DC converter 101. A ZigBee antenna 108 provides wireless transmission for ZigBee enabled MCU. An NPN transistor 109 provides an electronic control. Resistor R2 112 provides a resistance. Capacitor C1 113 provides a capacitance. A −DIM 116 provides a dimming signal. The alternating current hot line AC LINE 122, alternating current neutral line AC NEUTRAL 123 and alternating current ground line AC GROUND 124 can provide a power source. The IR remote transmitter 126 provides a infrared remote transmission for providing wireless control.

An ethernet cable 203 can provide internet access (WAN) 204. The LED driver 205 can have an LED Driver (Constant Current Mode) 205. The LED has an LED positive portion +LED 206 and an LED negative portion −LED 207. A second antenna Antenna Two 210 can provide a second wireless transmission. A transformer T1 601 can be electrically connected to a diode such as D4 IN4148 602. The diode can be electrically connected to a resistor such as R61 603. The resistor can be electrically connected to a capacitor such as C61 10 uF 604. The capacitor can be electrically connected to a Zener diode such as Z2 12V Zener 605. The Zener diode 605 can be electrically connected to a 12 V DC such as 12 VDC-ISO 606.

The optical isolator can have U5 607. The optical isolator can be electrically connected to one or more MOSFETs such as Q4 MOSFET-N 608 and Q5 MOSFET-N 609. The lighting device circuit 611 is electrically connected to the SW AC LINE red wire 111 and the AC NEUTRAL white wire 123. The MOSFETs can be electrically connected to a GND-ISO 612. The ACL-ON 701 and the +5 VDC 702 are both electrically connected to the MCU 706. The bridge rectifier 703 is electrically connected to resistor R64 470K 704 and R65 1K 706 which are then electrically connected to MCU 706.

Thus, it is intended that the present invention cover all modifications and variations of this invention as described, provided they come within the scope of the appended claims and their equivalents.

The invention claimed is:

1. A lighting controller comprising:
    a ZigBee enabled microcontroller unit including a ZigBee wireless transceiver;
    a phase control output receiving a control signal from the ZigBee enabled microcontroller unit to modulate a voltage from an alternating current hot line and an alternating current ground line using either leading edge (LE) dimming or trailing edge (TE) dimming for controlling a dimming luminaire, which is an LED light;
    at least one sensor chosen from the group consisting of a light detector, a motion detector, an acoustic detector, a temperature sensor, and a microwave detector, wherein the at least one sensor is electrically connected to the phase control output; and
    an AC/DC converter having an input connected to the alternating current hot line and an alternating current neutral line, and an output for providing a DC power output to the ZigBee enabled microcontroller unit, wherein the input is connected to a low power isolated transformer having a secondary winding in series-connection with a diode and a resistor forming a parallel connection with a capacitor and a Zener diode providing a 12V DC power supply, wherein the ZigBee wireless transceiver has a ZigBee antenna that provides a wireless transmission for the ZigBee enabled microcontroller unit, the ZigBee enabled microcontroller unit being directly connected to the at least one sensor, receiving data that represents outputs from the at least one sensor, processing the data, and modulating light output of the LED light according thereto, wherein the ZigBee enabled microcontroller unit is remotely connected to an infrared (IR) remote transmitter for receiving a wireless control signal therefrom and is wirelessly in communication with other local area networks via antennas thereof and discerning internet access via an Ethernet cable connection.

2. A lighting controller comprising:
    a ZigBee enabled microcontroller unit including a ZigBee wireless transceiver;
    a phase control output receiving a control signal from the ZigBee enabled microcontroller unit to modulate a voltage from an alternating current hot line and an alternating current ground line using either leading edge (LE) dimming or trailing edge (TE) dimming for controlling a dimming luminaire, which is an LED light;

at least one sensor chosen from the group consisting of a light detector, a motion detector, an acoustic detector, a temperature sensor, and a microwave detector, wherein the at least one sensor is electrically connected to the phase control output; and an AC/DC converter having an input connected to the alternating current hot line and an alternating current neutral line, and an output for providing a DC power output to the ZigBee enabled microcontroller unit, wherein the input is connected to a low power isolated transformer having a secondary winding in series-connection with a diode and a resistor forming a parallel connection with a capacitor and a Zener diode providing a 12V DC power supply, wherein the ZigBee wireless transceiver has a ZigBee antenna that provides a wireless transmission for the ZigBee enabled microcontroller unit, the ZigBee enabled microcontroller unit being directly connected to the at least one sensor, receiving data that represents outputs from the at least one sensor, processing the data, and modulating light output of the LED light according thereto, wherein the ZigBee enabled microcontroller unit is remotely connected to an infrared (IR) remote transmitter for receiving a wireless control signal therefrom, wherein the phase control output comprises an optical isolator for controlling a pair of MOSFETs including a first MOSFET and a second MOSFET connected in series to generate an AC phase cut dimming function, wherein an output of the pair of MOSFETs is grounded, a source of the second MOSFET is connected to an LED driver for driving the LED light.

3. The lighting controller of claim 2, wherein the LED light is made of a series of separate LED elements.

* * * * *